United States Patent
Oh et al.

(10) Patent No.: US 10,950,895 B2
(45) Date of Patent: Mar. 16, 2021

(54) ELECTROLYTE FOR LITHIUM SECONDARY BATTERY AND LITHIUM SECONDARY BATTERY INCLUDING THE SAME

(71) Applicant: LG Chem, Ltd., Seoul (KR)

(72) Inventors: Jeong Woo Oh, Daejeon (KR); Kyoung Ho Ahn, Daejeon (KR); Jun Hyeok Han, Daejeon (KR); Chui Haeng Lee, Daejeon (KR)

(73) Assignee: LG Chem, Ltd.

( * ) Notice: Subject to any disclaimer, the term of this patent is extended or adjusted under 35 U.S.C. 154(b) by 130 days.

(21) Appl. No.: 16/477,348

(22) PCT Filed: Nov. 1, 2018

(86) PCT No.: PCT/KR2018/013181
§ 371 (c)(1),
(2) Date: Jul. 11, 2019

(87) PCT Pub. No.: WO2019/088733
PCT Pub. Date: May 9, 2019

(65) Prior Publication Data
US 2019/0379087 A1 Dec. 12, 2019

(30) Foreign Application Priority Data

Nov. 3, 2017 (KR) .......................... 10-2017-0146223
Oct. 31, 2018 (KR) .......................... 10-2018-0132195

(51) Int. Cl.
*H01M 10/0567* (2010.01)
*H01M 4/134* (2010.01)
*H01M 4/38* (2006.01)
*H01M 10/052* (2010.01)
*H01M 4/02* (2006.01)

(52) U.S. Cl.
CPC ....... *H01M 10/0567* (2013.01); *H01M 4/134* (2013.01); *H01M 4/382* (2013.01); *H01M 10/052* (2013.01); *H01M 2004/027* (2013.01); *H01M 2300/0037* (2013.01); *H01M 2300/0085* (2013.01)

(58) Field of Classification Search
CPC ... H01M 10/0567; H01M 4/134; H01M 4/382
See application file for complete search history.

(56) References Cited

U.S. PATENT DOCUMENTS

| 10,243,239 | B1 | 3/2019 | Ahn et al. |
| 2003/0180624 | A1 | 9/2003 | Oh et al. |
| 2005/0019667 | A1 | 1/2005 | Oh et al. |
| 2006/0046150 | A1 | 3/2006 | Kashida et al. |
| 2011/0256456 | A1 | 10/2011 | Jeon et al. |
| 2013/0040207 | A1 | 2/2013 | Gupta et al. |
| 2013/0136998 | A1 | 5/2013 | Hwang et al. |
| 2019/0036162 | A1* | 1/2019 | Oh ...................... C08F 299/024 |
| 2020/0274197 | A1* | 8/2020 | Shin ...................... H01M 4/525 |
| 2020/0295402 | A1* | 9/2020 | Shin ...................... C08F 218/00 |
| 2020/0365939 | A1* | 11/2020 | Shin .................. H01M 10/0565 |

FOREIGN PATENT DOCUMENTS

| JP | 2008288127 A | 11/2008 |
| JP | 2012221677 A | 11/2012 |
| KR | 20060053204 A | 5/2006 |
| KR | 20080058197 A | 6/2008 |
| KR | 20130058403 A | 6/2013 |
| KR | 20140066163 A | 5/2014 |
| KR | 20160040128 A | 4/2016 |

OTHER PUBLICATIONS

Gerbaldi, C. et. al., "UV-curable siloxane-acrylate gel-copolymer electrolytes for lithium-based battery applications", Electrochimica Acta, vol. 55, No. 4, (Jan. 2010), pp. 1460-1467.
International Search Report from Application No. PCT/KR2018/013181 dated Mar. 8, 2019, 3 pages.

* cited by examiner

*Primary Examiner* — Matthew J Merkling
(74) *Attorney, Agent, or Firm* — Lerner, David, Littenberg, Krumholz & Mentlik, LLP

(57) ABSTRACT

An electrolyte for a lithium secondary battery and a lithium secondary battery including the same are disclosed herein. In an embodiment, an electrolyte for a lithium secondary battery includes a lithium salt, an organic solvent, and an oligomer represented by Formula 1 described in the present specification or a polymer derived from the oligomer represented by Formula 1. A lithium secondary battery including the electrolyte for a lithium secondary battery is improved by suppressing reactivity of lithium metal.

16 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATIONS

This application claims the benefit of Korean Patent Application Nos. 2017-0146223, filed on Nov. 3, 2017, and 2018-0132195, filed on Oct. 31, 2018, in the Korean Intellectual Property Office, the disclosure of which is incorporated herein in its entirety by reference.

TECHNICAL FIELD

The present invention relates to an electrolyte for a lithium secondary battery and a lithium secondary battery including the same.

BACKGROUND ART

Recently, interests in energy storage technologies have been increasingly grown. In particular, while the application of the energy storage technologies is expanded to mobile phones, camcorders, notebook PCs, and even to electric vehicles, research and efforts for the development of the energy storage technologies have been gradually materialized.

Electrochemical devices have received most attention in the field of energy storage technologies, and there emerges an interest in rechargeable secondary batteries among these electrochemical devices.

A lithium secondary battery is prepared by a process in which, after current collectors are respectively coated with a positive electrode active material and a negative electrode active material of appropriate thicknesses or the active materials themselves are prepared in the form of a film having an appropriate length, the resultant products are then wound or stacked with an insulating separator to prepare an electrode assembly, the electrode assembly is put into a can or a container similar thereto, and an electrolyte is then injected thereinto.

In this case, a liquid electrolyte including an electrolyte solution solvent, in which a lithium salt is dissolved, or a gel polymer electrolyte further including a matrix polymer may be generally used as the electrolyte.

The electrolyte solution solvent may include ethylene carbonate, propylene carbonate, dimethoxyethane, γ-butyrolactone, N,N-dimethylformamide, tetrahydrofuran, or acetonitrile.

The electrolyte solution solvent may not only cause a side reaction at a high voltage and an oxidation reaction when it is stored at high temperatures for a long time, but may also easily react with lithium (Li) metal in the form of dendrites formed on a negative electrode to cause an exothermic reaction. Particularly, in a case in which overcharge is performed at a predetermined state of charge (SOC) or more, since the oxidation reaction of the electrolyte is accelerated and the exothermic reaction between the electrolyte solution and the Li metal on the surface of the negative electrode, which is formed due to excessive migration of Li from a positive electrode to the negative electrode, is intensified, the battery may ignite or explode.

Thus, in order to improve stability and high output characteristics of the lithium secondary battery, there is a need to develop an electrolyte for a lithium secondary battery in which wetting property of the electrolyte may not only be improved, but reactivity with the lithium metal may also be suppressed.

PRIOR ART DOCUMENT

Korean Patent Application Laid-open Publication No. 2014-0066163

DISCLOSURE OF THE INVENTION

Technical Problem

An aspect of the present invention provides an electrolyte for a lithium secondary battery in which wettability is improved by reducing surface tension with a surface of an electrode.

Another aspect of the present invention provides a lithium secondary battery including the electrolyte for a lithium secondary battery.

Technical Solution

According to an aspect of the present invention, there is provided an electrolyte for a lithium secondary battery including:
a lithium salt;
an organic solvent; and
an oligomer represented by Formula 1 below or a polymer derived from the oligomer represented by Formula 1.

[Formula 1]

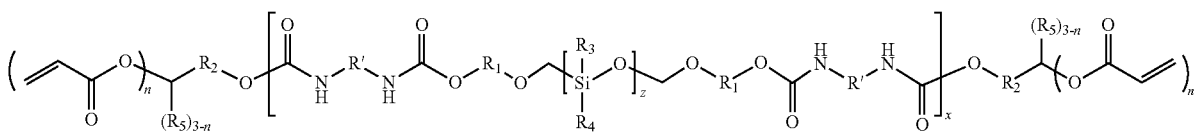

In Formula 1,
$R_1$ and $R_2$ are each independently a substituted or unsubstituted alkylene group having 1 to 5 carbon atoms,
$R_3$ and $R_4$ are each independently hydrogen or a substituted or unsubstituted alkyl group having 1 to 3 carbon atoms,
$R_5$ is hydrogen or a substituted or unsubstituted alkyl group having 1 to 5 carbon atoms,
R' is an aliphatic hydrocarbon group or an aromatic hydrocarbon group,
z and x are the numbers of repeating units,
z is an integer of 1 to 10,
x is an integer of 1 to 15, and
n is an integer of 1 to 3.

Specifically, in Formula 1, the aliphatic hydrocarbon group of R' may include at least one selected from the group consisting of (a) at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms and (b) at least one linear hydrocarbon group selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms, and the aromatic hydrocarbon group of R' may include at least one selected from the group consisting of a substituted or unsubstituted arylene group having 6 to 20 carbon atoms and a substituted or unsubstituted heteroarylene group having 2 to 20 carbon atoms.

Specifically, in Formula 1, the aliphatic hydrocarbon group of R' may include at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms.

The oligomer represented by Formula 1 may include at least one selected from the group consisting of oligomers represented by Formulae 1a and 1b below.

[Formula 1a]

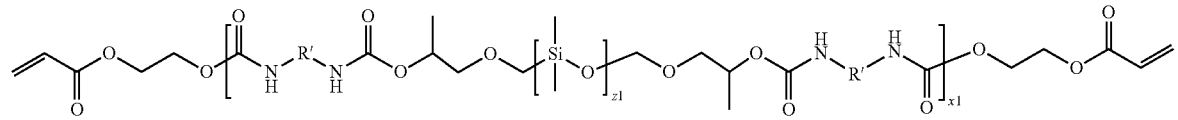

In Formula 1a,
R' is an aliphatic hydrocarbon group or an aromatic hydrocarbon group,
z1 and x1 are the numbers of repeating units,
z1 is an integer of 1 to 10, and
x1 is an integer of 1 to 15.

[Formula 1b]

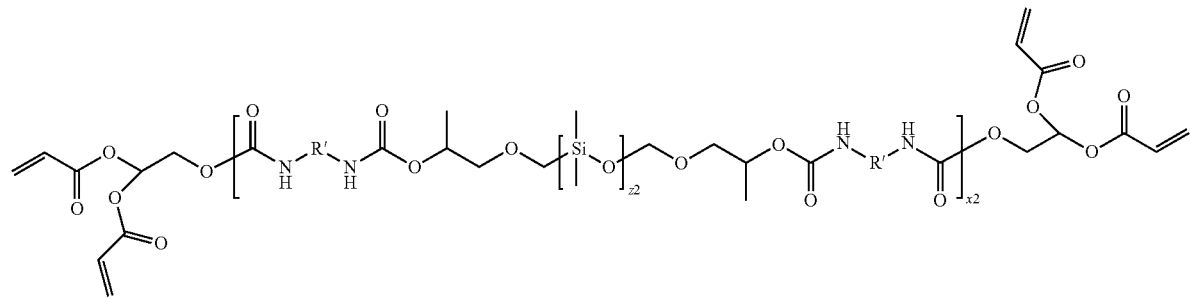

In Formula 1b,
R' is an aliphatic hydrocarbon group or an aromatic hydrocarbon group,
z2 and x2 are the numbers of repeating units,
z2 is an integer of 1 to 10, and
x2 is an integer of 1 to 15.

Specifically, the oligomer represented by Formula 1 may include at least one selected from the group consisting of oligomers represented by Formulae 1a-1 and 1b-1 below.

[Formula 1a-1]

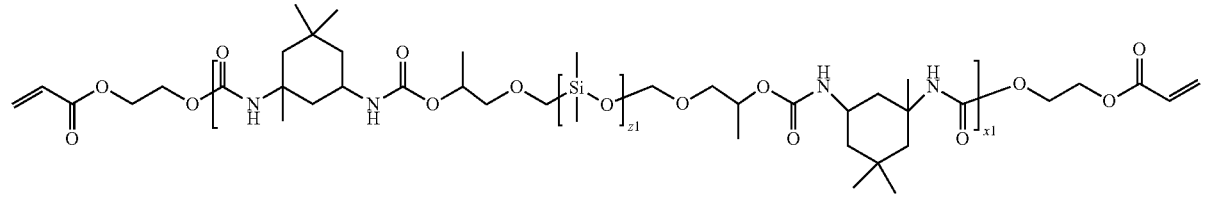

In Formula 1a-1,
z1 and x1 are the numbers of repeating units,
z1 is an integer of 1 to 10, and
x1 is an integer of 1 to 15.

[Formula 1b-1]

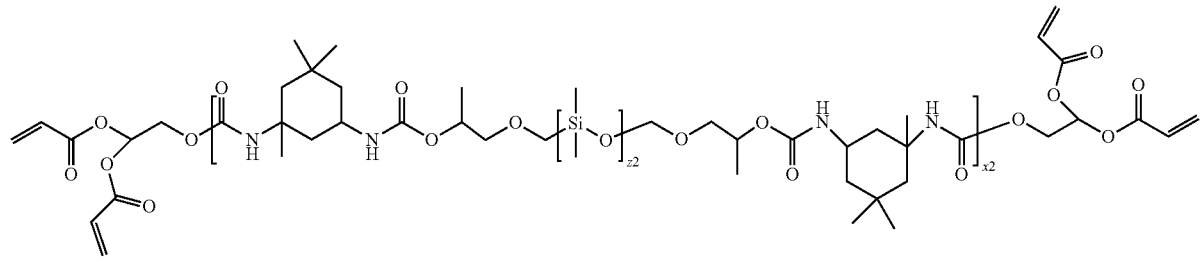

In Formula 1b-1,
z2 and x2 are the numbers of repeating units,
z2 is an integer of 1 to 10, and
x2 is an integer of 1 to 15.

The electrolyte for a lithium secondary battery of the present invention may be a liquid electrolyte containing the oligomer represented by Formula 1.

In this case, the oligomer represented by Formula 1 may be included in an amount of 0.5 wt % to 30 wt %, for example, 0.5 wt % to 25 wt % based on a total weight of the electrolyte for a lithium secondary battery.

Also, the electrolyte for a lithium secondary battery of the present invention may be a gel polymer electrolyte containing the polymer derived from the oligomer represented by Formula 1.

In this case, the polymer derived from the oligomer represented by Formula 1 may be a matrix polymer in which the oligomer represented by Formula 1 is polymerized in the presence of a polymerization initiator to have a three-dimensional structure.

Furthermore, the polymer derived from the oligomer represented by Formula 1 may be included in an amount of 0.5 wt % to 30 wt %, for example, 0.5 wt % to 25 wt % based on the total weight of the electrolyte for a lithium secondary battery.

According to another aspect of the present invention, there is provided a lithium secondary battery including the electrolyte for a lithium secondary battery of the present invention.

In this case, the electrolyte for a lithium secondary battery may be a liquid electrolyte or a gel polymer electrolyte.

Advantageous Effects

According to the present invention, since an electrolyte for a lithium secondary battery contains an oligomer having hydrophilic and hydrophobic functional groups or a polymer derived from the oligomer, the electrolyte for a lithium secondary battery capable of improving wettability by reducing surface tension with the surface of an electrode and suppressing a side reaction of the electrode with an electrolyte solution may be prepared. Also, an average voltage drop may be prevented by suppressing an increase in interfacial resistance of the electrode by including the electrolyte for a lithium secondary battery for a, and, as a result, a lithium secondary battery having improved charge and discharge efficiency may be prepared.

MODE FOR CARRYING OUT THE INVENTION

Hereinafter, the present invention will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may comprise plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

In the present specification, the expression "%" denotes wt % unless otherwise indicated explicitly.

The expressions "a" and "b" in the description of "a to b carbon atoms" in the specification each denote the number of carbon atoms included in a specific functional group. That is, the functional group may include "a" to "b" carbon atoms. For example, the expression "alkyl group having 1 to 3 carbon atoms" denotes an alkyl group including 1 to 3 carbon atoms, that is, —$CH_3$, —$CH_2CH_3$, —$CH_2CH_2CH_3$, or —$CH_2$ ($CH_2$) $CH_3$.

In the present specification, the expression "arylene group" denotes a functional group in the form in which a hydrogen atom is separated from an aromatic hydrocarbon. In an embodiment, the arylene group includes a phenylene group, a biphenylene group, a terphenylene group, a naphthylene group, and a phenanthrylene group, but the present invention is not limited thereto, and each thereof may be selectively substituted in another exemplary embodiment.

Also, in the present specification, the expression "hetero" denotes that at least one heteroatom selected from the group consisting of nitrogen (N), oxygen (O), sulfur (S), or phosphorus (P) is contained in one functional group, and the remainder is carbon unless otherwise defined.

Furthermore, the expression "heterocycloalkylene group" throughout this specification denotes that at least one heteroatom of N, O, S, or P exists in a ring compound having 2 to 20 carbon atoms instead of carbon.

Also, unless otherwise defined in the specification, the expression "substitution" denotes that at least one hydrogen bonded to carbon is substituted with an element other than hydrogen, for example, an alkyl group having 1 to 3 carbon atoms.

Electrolyte for Lithium Secondary Battery

Specifically, an embodiment of the present invention may provide an electrolyte for a lithium secondary battery including: a lithium salt; an organic solvent; and an oligomer represented by the following Formula 1 or a polymer derived from the oligomer represented by Formula 1.

[Formula 1]

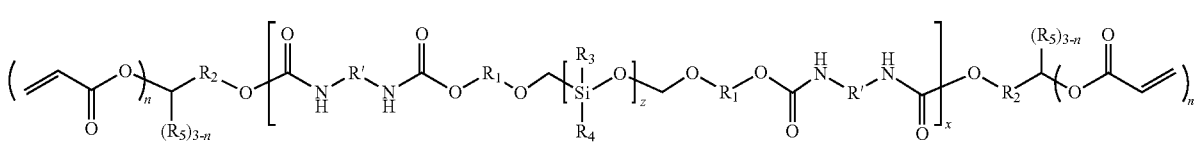

In Formula 1, $R_1$ and $R_2$ are each independently a substituted or unsubstituted alkylene group having 1 to 5 carbon atoms, $R_3$ and $R_4$ are each independently hydrogen or a substituted or unsubstituted alkyl group having 1 to 3 carbon atoms, $R_5$ is hydrogen or a substituted or unsubstituted alkyl group having 1 to 5 carbon atoms, R' is an aliphatic hydrocarbon group or an aromatic hydrocarbon group, z and x are the numbers of repeating units, z is an integer of 1 to 10, x is an integer of 1 to 15, and n is an integer of 1 to 3.

Specifically, the electrolyte for a lithium secondary battery of the present invention may be a liquid electrolyte including a lithium salt, an organic solvent, and the oligomer represented by Formula 1.

Also, the electrolyte for a lithium secondary battery of the present invention may be a gel polymer electrolyte for a lithium secondary battery which includes a lithium salt, an organic solvent, and a polymer derived from the oligomer represented by Formula 1.

(1) Liquid Electrolyte for Lithium Secondary Battery

In an embodiment of the present invention, provided is an electrolyte for a lithium secondary battery which includes a lithium salt, an organic solvent, and the oligomer represented by Formula 1.

In this case, the electrolyte for a lithium secondary battery may be a liquid electrolyte.

(1-1) Lithium Salt

Any lithium salt typically used in an electrolyte for a lithium secondary battery may be used as the lithium salt used in the electrolyte for a lithium secondary battery of the present invention without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof, and, in addition thereto, a lithium salt, such as a lithium imide salt represented by lithium bisperfluoroethanesulfonimide (LiBETI, $LiN(SO_2C_2F_5)_2$), lithium fluorosulfonyl imide (LiFSI, $LiN(SO_2F)_2$), and lithium (bis)trifluoromethanesulfonimide (LiTFSI, $LiN(SO_2CF_3)_2$) which are typically used in an electrolyte solution of the lithium secondary battery, may be used without limitation. Specifically, the lithium salt may include a single material selected from the group consisting of $LiPF_6$, $LiBF_4$, $LiCH_3CO_2$, $LiCF_3CO_2$, $LiCH_3SO_3$, LiFSI, LiTFSI, and $LiN(C_2F_5SO_2)_2$, or a mixture of two or more thereof.

The lithium salt may be appropriately changed in a normally usable range, but may specifically be included in a concentration of 0.1 M to 3 M, for example, 0.8 M to 2.5 M in the electrolyte. In a case in which the concentration of the lithium salt is greater than 3 M, since viscosity of the electrolyte is increased, a lithium ion-transfer effect may be reduced.

(1-2) Organic Solvent

The organic solvent may include at least one organic solvent selected from the group consisting of a cyclic carbonate-based organic solvent, a linear carbonate-based organic solvent, a linear ester-based organic solvent, and a cyclic ester-based organic solvent.

Specifically, the organic solvent may include a cyclic carbonate-based organic solvent and a linear carbonate-based organic solvent.

Specific examples of the cyclic carbonate-based organic solvent may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, and vinylene carbonate, or a mixture of two or more thereof, and, among them, the cyclic carbonate-based organic solvent may include ethylene carbonate which well dissociates the lithium salt in the electrolyte due to high permittivity as a highly viscous organic solvent.

Also, the linear carbonate-based organic solvent is an organic solvent having low viscosity and low permittivity, wherein, typical examples of the linear carbonate-based organic solvent may be at least one selected from the group consisting of dimethyl carbonate (DMC), diethyl carbonate (DEC), dipropyl carbonate, ethylmethyl carbonate (EMC), methylpropyl carbonate, and ethylpropyl carbonate.

Furthermore, the organic solvent may further include a linear ester-based organic solvent and/or a cyclic ester-based organic solvent to prepare an electrolyte solution having high electrical conductivity.

Specific examples of the linear ester-based organic solvent may be at least one selected from the group consisting of methyl acetate, ethyl acetate, propyl acetate, methyl propionate, ethyl propionate, propyl propionate, and butyl propionate.

Also, the cyclic ester-based organic solvent may include at least one selected from the group consisting of γ-butyrolactone, γ-valerolactone, γ-caprolactone, σ-valerolactone, and ε-caprolactone.

Furthermore, the organic solvent may be used by adding an organic solvent typically used in an electrolyte solution for a lithium secondary battery without limitation, if necessary. For example, the organic solvent may include at least one organic solvent of an ether-based organic solvent and a nitrile-based organic solvent.

The ether-based organic solvent may include any one selected from the group consisting of dimethyl ether, diethyl ether, dipropyl ether, methylethyl ether, methylpropyl ether, and ethylpropyl ether.

The nitrile-based organic solvent, for example, may include any one selected from the group consisting of acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

(1-3) Compound Represented by Formula 1

The electrolyte for a lithium secondary battery of the present invention may include an oligomer represented by Formula 1 below.

tuted or unsubstituted arylene group having 6 to 20 carbon atoms and a substituted or unsubstituted heteroarylene group having 2 to 20 carbon atoms.

Specifically, in Formula 1, the aliphatic hydrocarbon group of R' may include at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms.

Since the oligomer represented by Formula 1 contains a siloxane group (—Si—O—) and a urethane group (—N—C(O)O—), as a hydrophobic portion, as well as an acrylate-based functional group as a hydrophilic portion capable of forming a crosslink at both ends by itself, it acts as a surfactant in the battery to be able to reduce interfacial resistance by a balanced affinity between a positive electrode or separator (SRS layer), as the hydrophilic portion, and a negative electrode or separator fabric as the hydrophobic portion. Therefore, the electrolyte for a lithium secondary battery including the oligomer represented by Formula 1 may have a more improved wetting effect.

Also, since the oligomer represented by Formula 1 may form a stable ion conductive film on a surface of the negative electrode during initial charge and may simultaneously

[Formula 1]

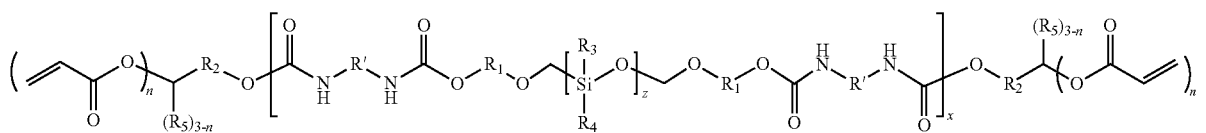

In Formula 1, $R_1$ and $R_2$ are each independently a substituted or unsubstituted alkylene group having 1 to 5 carbon atoms, $R_3$ and $R_4$ are each independently hydrogen or a substituted or unsubstituted alkyl group having 1 to 3 carbon atoms, $R_5$ is hydrogen or a substituted or unsubstituted alkyl group having 1 to 5 carbon atoms, R' is an aliphatic hydrocarbon group or an aromatic hydrocarbon group, z and x are the numbers of repeating units, z is an integer of 1 to 10, x is an integer of 1 to 15, and n is an integer of 1 to 3.

In this case, in Formula 1, the aliphatic hydrocarbon group of R' may include at least one selected from the group consisting of (a) at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms and (b) at least one linear hydrocarbon group selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms.

Also, the aromatic hydrocarbon group of R' may include at least one selected from the group consisting of a substisuppress a side reaction between the electrolyte and lithium (Li) metal precipitated on the surface of the negative electrode during overcharge, it is possible to suppress an increase of the interfacial resistance of the electrode and the resulting change in the average voltage during charge and discharge in comparison to a conventional electrolyte for a lithium secondary battery. Thus, a lithium secondary battery having improved charge and discharge efficiency and high rate capability may be provided.

It is desirable that the oligomer represented by Formula 1 of the present invention includes a siloxane group (—[Si—O]—) and a urethane group, as repeating units of the main chain, and the oligomer does not further include a —Si— group as well as the siloxane group in the structure. That is, since the oligomer does not include an additional —Si— group as a repeating unit in the oligomer structure, a ratio of functional groups at both ends may be increased and a molecular weight of the whole polymer may be reduced, and thus, assuming that the same amount is added to the electrolyte, the amount of the total oligomer relative to an oligomer further including a —Si— group in the structure (for example, —[Si—O]—Si— structure is included as the main-chain repeat unit) may be increased. Therefore, since a reaction rate of the gel polymer may be advantageously controlled and hardness of the entire battery may be increased by increasing hardness of the gel polymer, it may be more advantageous in safety evaluation with physical impact, for example, impact evaluation.

Specifically, the oligomer represented by Formula 1 may include at least one selected from the group consisting of oligomers represented by Formulae 1a and 1b below.

[Formula 1a]

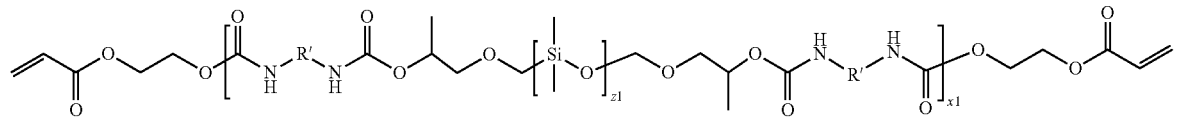

In Formula 1a,
R' is an aliphatic hydrocarbon group or an aromatic hydrocarbon group,
z1 and x1 are the numbers of repeating units,
z1 is an integer of 1 to 10, and
x1 is an integer of 1 to 15.

In Formula 1b-1,
z2 and x2 are the numbers of repeating units,
z2 is an integer of 1 to 10, and
x2 is an integer of 1 to 15.

A weight-average molecular weight (Mw) of the oligomer represented by Formula 1 may be controlled by the number

[Formula 1b]

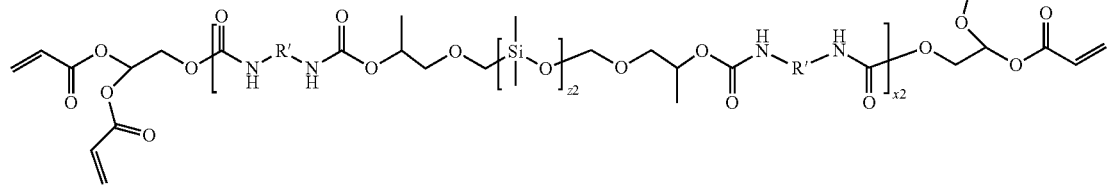

In Formula 1b,
R' is an aliphatic hydrocarbon group or an aromatic hydrocarbon group,
z2 and x2 are the numbers of repeating units,
z2 is an integer of 1 to 10, and
x2 is an integer of 1 to 15.

Specifically, the oligomer represented by Formula 1 may include at least one selected from the group consisting of oligomers represented by Formulae 1a-1 and 1b-1 below.

of repeating units, and may be in a range of about 1,000 g/mol to about 100,000 g/mol, particularly 1,000 g/mol to 50,000 g/mol, and more particularly 1,000 g/mol to 10,000 g/mol. In a case in which the weight-average molecular weight of the oligomer is within the above range, the wetting effect of the electrolyte solution may be improved. In addition, since it is easy to substitute various functional groups as needed, various performance improvement effects may be obtained.

[Formula 1a-1]

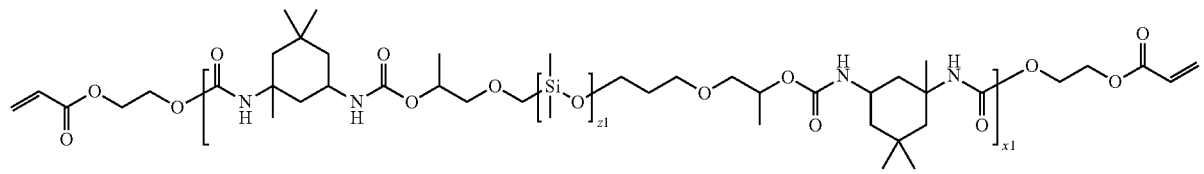

In Formula 1a-1,
z1 and x1 are the numbers of repeating units,
z1 is an integer of 1 to 10, and
x1 is an integer of 1 to 15.

If the weight-average molecular weight of the oligomer is less than 1,000 g/mol, electrochemical stability and role of surfactant may not be expected and an effect of suppressing the side reaction on the surface of the electrode may be

[Formula 1b-1]

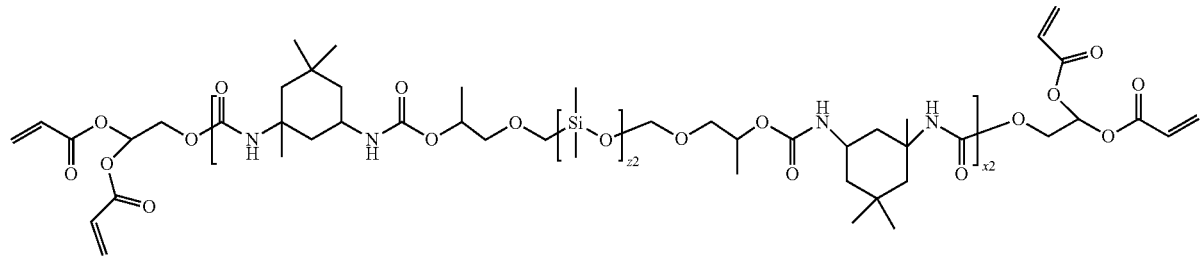

insignificant due to a decrease in functional group content, and, if the weight-average molecular weight of the oligomer is greater than 100,000 g/mol, solubility in the organic solvent may be reduced.

The weight-average molecular weight may denote a standard polystyrene-equivalent value measured by gel permeation chromatography (GPC), and, unless otherwise specified, a molecular weight may denote the weight-average molecular weight. For example, in the present invention, the GPC conditions are as follows: the weight-average molecular weight is measured by using 1200 series by Agilent Technologies, a PL mixed B column by Agilent Technologies may be used in this case, and tetrahydrofuran (THF) may be used as a solvent.

The oligomer represented by Formula 1 may be included in an amount of 0.5 wt % to 30 wt %, particularly 0.5 wt % to 25 wt %, more particularly 0.5 wt % to 10 wt %, and most particularly 0.5 wt % to 5 wt % based on a total weight of the electrolyte for a lithium secondary battery.

In a case in which the amount of the oligomer represented by Formula 1 is 0.5 wt % or more, the control of reactivity with the lithium metal and an electrochemical stability effect may be expected, and, in a case in which the amount of the oligomer represented by Formula 1 is 30 wt % or less, since an increase in resistance due to the addition of an excessive amount of the oligomer is prevented, wettability may be secured and simultaneously, it is possible to prevent disadvantages, such as a decrease in ion conductivity, by improving restrictions on the movement of lithium ions. If the amount of the oligomer represented by Formula 1 is greater than 30 wt %, since viscosity of the electrolyte solution is increased while solubility of the oligomer in the electrolyte solution is decreased, ionic conductivity of the electrolyte is reduced. As a result, the interfacial resistance of the electrode may be increased to cause a voltage drop of the battery.

(1-4) Additional Additives

Furthermore, in order to prevent a non-aqueous electrolyte solution from being decomposed to cause collapse of the negative electrode in a high output environment, or further improve low-temperature high-rate discharge characteristics, high-temperature stability, overcharge protection, and an effect of improving swelling during high-temperature storage, the electrolyte for a lithium secondary battery of the present invention may further include additional additives capable of forming a more stable ion conductive film on the surface of the electrode in addition to the compound of Formula 1.

As a representative example, the additional additive may include at least one selected from the group consisting of a sultone-based compound, a halogen-substituted carbonate-based compound, a nitrile-based compound, a cyclic sulfite-based compound, and a cyclic carbonate-based compound.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone. The sultone-based compound may be included in an amount of 5 wt % or less based on a total weight of the non-aqueous electrolyte solution. In a case in which the amount of the sultone-based compound in the non-aqueous electrolyte solution is greater than 5 wt %, since a thick film is formed due to the excessive amount of the additive, output degradation and an increase in resistance may occur.

Also, the halogen-substituted carbonate-based compound may include fluoroethylene carbonate (FEC) and may be included in an amount of 5 wt % or less based on the total weight of the non-aqueous electrolyte solution. In a case in which the amount of the halogen-substituted carbonate-based compound is greater than 5 wt %, cell swelling performance may deteriorate.

Furthermore, the nitrile-based compound may include at least one compound selected from the group consisting of succinonitrile, adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The nitrile-based compound may be included in an amount of 8 wt % or less based on the total weight of the non-aqueous electrolyte solution. In a case in which the total amount of the nitrile-based compound in the non-aqueous electrolyte solution is greater than 8 wt %, since the resistance is increased due to an increase in the film formed on the surface of the electrode, battery performance may deteriorate.

Also, the cyclic sulfite-based compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, and may be included in an amount of 5 wt % or less based on the total weight of the non-aqueous electrolyte solution. In a case in which the amount of the cyclic sulfite-based compound is greater than 5 wt %, since a thick film is formed due to the excessive amount of the additive, the output degradation and the increase in resistance may occur.

Furthermore, the cyclic carbonate-based compound may include vinylene carbonate (VC) or vinyl ethylene carbonate, and may be included in an amount of 3 wt % or less based on the total weight of the non-aqueous electrolyte solution. In a case in which the amount of the cyclic carbonate-based compound in the non-aqueous electrolyte solution is greater than 3 wt %, cell swelling inhibition performance may deteriorate.

Specifically, the additional additive may be a cyclic carbonate-based compound.

The additional additives may be used as a mixture of two or more thereof, and may be included in an amount of 20 wt % or less, particularly 0.01 wt % to 20 wt %, and preferably 0.1 wt % to 10 wt % based on the total weight of the electrolyte solution. If the amount of the additional additive is less than 0.01 wt %, effects of improving low-temperature output, high-temperature storage characteristics, and high-temperature life characteristics of the battery are insignificant, and, if the amount of the additional additive is greater than 20 wt %, there is a possibility that the side reaction in the electrolyte solution occurs excessively during charge and discharge of the battery. Particularly, since the additives for forming a solid electrolyte interface (SEI) may not be sufficiently decomposed at high temperatures when excessive amounts of the additives for forming an SEI are added, the additives for forming an SEI may be present in the form of unreacted material or precipitates in the electrolyte solution at room temperature. Accordingly, a side reaction may occur in which lifetime or resistance characteristics of the secondary battery are degraded.

(2) Gel Polymer Electrolyte for Lithium Secondary Battery

Also, in an embodiment of the present invention, provided is an electrolyte for a lithium secondary battery which includes a lithium salt, an organic solvent, and a polymer derived from the oligomer represented by Formula 1.

The electrolyte for a lithium secondary battery may be formed by thermally polymerizing a composition for a gel polymer electrolyte which includes the lithium salt, the organic solvent, the oligomer represented by the Formula 1, and a polymerization initiator.

The polymer derived from the oligomer represented by Formula 1 may include a matrix polymer which is formed by cross-linking the oligomer represented by Formula 1 in a three-dimensional structure in the presence of a polymerization initiator.

The electrolyte for a lithium secondary battery of the present invention may be a gel phase electrolyte including a non-aqueous electrolyte solution in which the lithium salt is dissolved in the matrix polymer which is formed by cross-linking the oligomer represented by Formula 1 in a three-dimensional structure.

Since descriptions of types and concentrations of the lithium salt, the organic solvent, and the oligomer, which are included in the composition for a gel polymer electrolyte provided to prepare the electrolyte for a lithium secondary battery of the present invention, overlap with those described above, the descriptions thereof will be omitted.

In this case, the oligomer represented by Formula 1 may be included in an amount of 0.5 wt % to 30 wt %, particularly 0.5 wt % to 25 wt %, more particularly 0.5 wt % to 10 wt %, and most particularly 0.5 wt % to 5 wt % based on a total weight of the composition for a gel polymer electrolyte.

If the amount of the oligomer represented by Formula 1 included is within the above range, i.e., 0.5 wt % to 30 wt %, since a polymer network having excellent mechanical strength may be formed, a secondary battery having improved overall performance may be prepared. Specifically, if the amount of the oligomer represented by Formula 1 is 0.5 wt % or more based on the total weight of the composition for a gel polymer electrolyte, the polymer matrix may be easily formed by the oligomer and mechanical strength of the gel polymer electrolyte may be secured. Also, if the amount of the oligomer represented by Formula 1 is 30 wt % or less based on the total weight of the composition for a gel polymer electrolyte, the increase in resistance due to the addition of the excessive amount of the oligomer may be prevented, wetting of the composition for a gel polymer electrolyte may be improved by ensuring appropriate viscosity, and a pre-gel reaction may be prevented. Furthermore, since ionic conductivity may be secured by improving the restrictions on the movement of lithium ions, cycle life characteristics may be improved. If the amount of the oligomer represented by Formula 1 is greater than 30 wt %, since viscosity of the composition is increased while solubility of the oligomer in the composition for a gel polymer electrolyte is decreased, wettability may be reduced and the interfacial resistance of the electrode may be increased to cause a voltage drop of the battery.

The polymer derived from the oligomer represented by Formula 1 may be included in an amount of 0.5 wt % to 30 wt %, particularly 0.5 wt % to 25 wt %, more particularly 0.5 wt % to 10 wt %, and most particularly 0.5 wt % to 5 wt % based on the total weight of the electrolyte for a lithium secondary battery.

That is, the polymer derived from the oligomer represented by Formula 1 is a matrix polymer in which the oligomer represented by Formula 1 is formed in a three-dimensional structure by thermal polymerization, wherein it is desirable that the amount thereof is the same as the amount of the oligomer represented by Formula 1 included in the composition for a gel polymer electrolyte.

In this case, if the amount of the polymer derived from the oligomer represented by Formula 1 is 0.5 wt % or more, physical properties, such as mechanical strength, of the gel polymer electrolyte may be secured. Also, if the amount of the polymer derived from the oligomer represented by Formula 1 is 30 wt % or less, the increase in resistance due to the addition of the excessive amount of the oligomer may be prevented, and the ionic conductivity may be secured by improving the restrictions on the movement of lithium ions. If the amount of the polymer derived from the oligomer represented by Formula 1 is greater than 30 wt %, the ionic conductivity of the electrolyte may be reduced, and the interfacial resistance of the electrode may be increased to cause a voltage drop of the battery.

Furthermore, as described above, since the polymer derived from the oligomer represented by Formula 1 may form a stable ion conductive film on the surface of the electrode during initial charge and may simultaneously suppress the side reaction between the electrolyte and the Li metal precipitated on the surface of the negative electrode during overcharge and an oxidation reaction with the positive electrode, the polymer derived from the oligomer represented by Formula 1 may suppress the increase in the interfacial resistance of the electrode and the resulting change in average voltage during charge and discharge in comparison to a conventional electrolyte for a lithium secondary battery.

In addition, since the polymer derived from the oligomer represented by Formula 1 has ability to dissociate the lithium salt, it may improve lithium ion mobility. In particular, since the polymer derived from the oligomer represented by Formula 1 contains a functional group, such as a siloxane group (—Si—O—), having very high electrochemical stability and low reactivity with Li ions as a repeating unit of a main chain, it may control a side reaction of the lithium ions ($Li^+$) and a decomposition reaction of the lithium salt, and thus, the generation of gas, such as CO or $CO_2$, may be reduced during overcharge. Therefore, stability of the secondary battery may be further improved by suppressing ignition during overcharge.

It is desirable that the polymer derived from the oligomer represented by Formula 1 of the present invention includes a siloxane group (—[Si—O]—) and a urethane group, as repeating units of the main chain, and the oligomer does not further include a —Si— group as well as the siloxane group in the structure. That is, since the oligomer does not include an additional —Si— group as a repeating unit in the oligomer structure, a ratio of functional groups at both ends may be increased and a molecular weight of the whole polymer may be reduced, and thus, assuming that the same amount is added to the electrolyte, the amount of the total oligomer relative to an oligomer further including a —Si— group in the structure (for example, —[Si—O]—Si— structure is included as the main-chain repeat unit) may be increased. Therefore, since a reaction rate of the gel polymer may be advantageously controlled and hardness of the entire battery may be increased by increasing hardness of the gel polymer, it may be more advantageous in safety evaluation with physical impact, for example, impact evaluation.

(2-1) Polymerization Initiator

A typical polymerization initiator known in the art may be used as the polymerization initiator used for preparing the gel polymer electrolyte. For example, the polymerization initiator may be decomposed by heat to form a radical and may form a gel polymer electrolyte by reacting with the oligomer represented by Formula 1 by free radical polymerization.

Specifically, as the polymerization initiator, an azo-based polymerization initiator or a peroxide-based polymerization initiator may be used, and, as a representative example, the polymerization initiator may include at least one peroxide-based compound selected from the group consisting of benzoyl peroxide, acetyl peroxide, dilauryl peroxide, di-tert-butyl peroxide, t-butyl peroxy-2-ethyl-hexanoate, cumyl hydroperoxide, and hydrogen peroxide, or at least one azo-based compound selected from the group consisting of 2,2'-azobis(2-cyanobutane), dimethyl 2,2-azobis(2-methyl-propionate), 2,2'-azobis(methylbutyronitrile), 2,2'-azobis (iso-butyronitrile) (AIBN), and 2,2'-azobisdimethyl-valeronitrile (AMVN).

The polymerization initiator may be dissociated by heat in the battery, for a non-limiting example, at a temperature of 30° C. to 100° C., for example, 60° C. to 80° C., or may be dissociated at room temperature (5° C. to 30° C.) to form a radical, and a polymerizable oligomer may be reacted with an acrylate-based compound by free radical polymerization to form a gel polymer electrolyte.

The polymerization initiator may be included in an amount of about 0.01 part by weight to about 20 parts by weight, for example, 5 parts by weight based on total 100 parts by weight of the oligomer, and, in a case in which the polymerization initiator is included within the above range, since a gelation reaction may be facilitated, gel polymer electrolyte characteristics may be secured by increasing a gel polymer conversion rate, the cause of a side reaction by the remaining unreacted polymerization initiator after the polymerization may be prevented, and wetting of the electrolyte solution to the electrode may be improved.

In particular, with respect to some polymerization initiators, nitrogen or oxygen gas may be generated during the occurrence of a radical by heat or the like. The gas generation most likely leads to a gas trap or gas bubbling phenomenon during the formation of the gel polymer electrolyte. Since the gas generation causes defects in the gel polymer electrolyte, this results in quality degradation of the electrolyte. Thus, in the case that the polymerization initiator is included within the above range, disadvantages, for example, the generation of a large amount of gas, may be more effectively prevented.

Secondary Battery

Also, in an embodiment of the present invention, provided is a lithium secondary battery including a negative electrode, a positive electrode, a separator disposed between the negative electrode and the positive electrode, and the electrolyte for a lithium secondary battery of the present invention.

The electrolyte for a lithium secondary battery may be a liquid electrolyte or a gel polymer electrolyte.

In a case in which the electrolyte for a lithium secondary battery is a liquid electrolyte, the lithium secondary battery of the present invention may be prepared by accommodating an electrode assembly, which is formed by sequentially stacking the positive electrode, the negative electrode, and the separator selectively disposed between the positive electrode and the negative electrode, in a secondary battery case or a case and then injecting the electrolyte for a lithium secondary battery of the present invention.

Furthermore, in a case in which the electrolyte for a lithium secondary battery is a gel polymer electrolyte including a polymer matrix which is formed by polymerization of the oligomer represented by Formula 1, the lithium secondary battery of the present invention may be prepared by accommodating an electrode assembly, which is formed by sequentially stacking the positive electrode, the negative electrode, and the separator selectively disposed between the positive electrode and the negative electrode, in a secondary battery case or a case, injecting the electrolyte for a lithium secondary battery, and then performing a curing reaction.

For example, the gel polymer electrolyte may be formed by in-situ polymerization in the secondary battery after the injection of the electrolyte for a lithium secondary battery. The in-situ polymerization may be performed by using an electron beam (E-beam), γ-rays, and a room temperature or high temperature aging process, and, according to an embodiment of the present invention, the in-situ polymerization may be performed by thermal polymerization. In this case, polymerization time required may be in a range of about 2 minutes to about 48 hours, and thermal polymerization temperature may be in a range of 60° C. to 100° C., for example, 60° C. to 80° C.

In the lithium secondary battery of the present invention, any positive electrode, negative electrode, and separator, which are prepared by a conventional method and used during the preparation of a lithium secondary battery, may be used as the positive electrode, negative electrode, and separator.

(1) Positive Electrode

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.5}Mn_{0.1}Co_{0.1})O_2$), or lithium nickel cobalt aluminum oxide (e.g., $LiNi_{0.8}Co_{0.15}Al_{0.05}O_2$ etc.)

The positive electrode active material may be included in an amount of 40 wt % to 90 wt %, for example, 40 wt % to 75 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

Any conductive agent may be used as the conductive agent without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The conductive agent is commonly added in an amount of 1 wt % to 30 wt % based on the total weight of the solid content in the positive electrode slurry.

Those sold under the names, such as acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon), may be used as the conductive agent.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

The negative electrode may be a metal electrode using a metal or metalloid thin film alone, or may be composed of a structure in which the metal or metalloid thin film is stacked on a negative electrode collector.

In this case, the metal or metalloid may be at least one selected from the group consisting of lithium (Li), copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), tin (Sn), silver (Ag), platinum (Pt), and gold (Au).

Specifically, a Li metal electrode may be used as the negative electrode.

As the negative electrode, a metal electrode may be used alone, or one prepared by forming a negative electrode material mixture layer on a negative electrode collector may also be used, in addition to the one composed of a structure, in which the metal or metalloid thin film is stacked on a negative electrode collector.

The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may further include at least one selected from the group consisting of a carbon material capable of reversibly intercalating/deintercalating lithium ions, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me:manganese (Mn), Fe, Pb, or Ge; Me': Al, boron (B), P, Si, Groups I, II and III elements of the periodic table, or halogen; $0 \le x \le 1$; $1 \le y \le 3$; $1 \le z \le 8$) may be used as the metal composite oxide.

The material, which may be doped and undoped with lithium, may include Si, $SiO_x$ ($0 \le x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), Pt, Cu, Ag, Au, Zn, cadmium (Cd), B, Al, gallium (Ga), Sn, In, Ge, P, arsenic (As), Sb, bismuth (Bi), S, selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

(3) Separator

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Lithium Secondary Battery Including Liquid Electrolyte

Example 1

(Preparation of Liquid Electrolyte for Lithium Secondary Battery)

A liquid electrolyte for a lithium secondary battery was prepared by adding 0.5 g of the oligomer represented by Formula 1a-1 (weight-average molecular weight (Mw): 3,000, z1=10, x1=3) to 99.5 g of an organic solvent (volume ratio of ethylene carbonate (EC):ethyl methyl carbonate (EMC)=3:7) in which 1 M $LiPF_6$ was dissolved (see Table 1 below)

(Electrode Assembly Preparation)

$LiNi_{3/5}Co_{1/5}Mn_{1/5}O_2$ (NCM) as a positive electrode active material, carbon black as a conductive agent, and polyvinylidene fluoride (PVDF), as a binder, were added in a weight ratio of 94:3:3 to N-methyl-2-pyrrolidone (NMP), as a solvent, to prepare a positive electrode mixture slurry (solid content: 65 wt %). An about 20 μm thick aluminum (Al) thin film, as a positive electrode collector, was coated with the positive electrode mixture slurry and dried, and the coated Al thin film was then roll-pressed to prepare a positive electrode.

A lithium metal electrode was used as a negative electrode.

An electrode assembly was prepared by sequentially stacking the positive electrode, the negative electrode, and a separator formed of three layers of polypropylene/polyethylene/polypropylene (PP/PE/PP).

(Secondary Battery Preparation)

The prepared electrode assembly was put in a battery case, and the electrolyte for a lithium secondary battery was injected and then stored for 2 days at room temperature to prepare a coin cell-type lithium secondary battery including the liquid electrolyte for a lithium secondary battery.

Example 2

A liquid electrolyte for a lithium secondary battery and a coin cell-type lithium secondary battery including the same were prepared in the same manner as in Example 1 except that 20 g of the oligomer represented by Formula 1a-1 was included in 80 g of the organic solvent during the preparation of the liquid electrolyte (see Table 1 below).

Example 3

A liquid electrolyte for a lithium secondary battery and a coin cell-type lithium secondary battery including the same were prepared in the same manner as in Example 1 except that 10 g of the oligomer represented by Formula 1a-1 was included in 90 g of the organic solvent during the preparation of the liquid electrolyte (see Table 1 below).

Example 4

A liquid electrolyte for a lithium secondary battery and a coin cell-type lithium secondary battery including the same were prepared in the same manner as in Example 3 except that the oligomer represented by Formula 1b-1 (weight-average molecular weight (Mw): 5,000, z2=8, x2=6) was used instead of the oligomer represented by Formula 1a-1 during the preparation of the liquid electrolyte (see Table 1 below).

Example 5

A liquid electrolyte for a lithium secondary battery and a coin cell-type lithium secondary battery including the same were prepared in the same manner as in Example 1 except that 25 g of the oligomer represented by Formula 1a-1 was included in 75 g of the organic solvent during the preparation of the liquid electrolyte (see Table 1 below).

Example 6

A liquid electrolyte for a lithium secondary battery and a coin cell-type lithium secondary battery including the same were prepared in the same manner as in Example 1 except that 30 g of the oligomer represented by Formula 1a-1 was included in 70 g of the organic solvent during the preparation of the liquid electrolyte (see Table 1 below).

Example 7

A liquid electrolyte for a lithium secondary battery and a coin cell-type lithium secondary battery including the same were prepared in the same manner as in Example 1 except that 33 g of the oligomer represented by Formula 1a-1 was included in 67 g of the organic solvent during the preparation of the liquid electrolyte (see Table 1 below).

Comparative Example 1

A liquid electrolyte for a lithium secondary battery and a coin cell-type lithium secondary battery including the same were prepared in the same manner as in Example 1 except that the oligomer represented by Formula 1a-1 was not included during the preparation of the liquid electrolyte (see Table 1 below).

Comparative Example 2

A liquid electrolyte for a lithium secondary battery and a coin cell-type lithium secondary battery including the same were prepared in the same manner as in Example 1 except that an oligomer represented by the following Formula 2 (weight-average molecular weight (Mw): 7,800, o: 35, p: 30, q: 20) was included instead of the oligomer represented by Formula 1a-1 during the preparation of the liquid electrolyte (see Table 1 below).

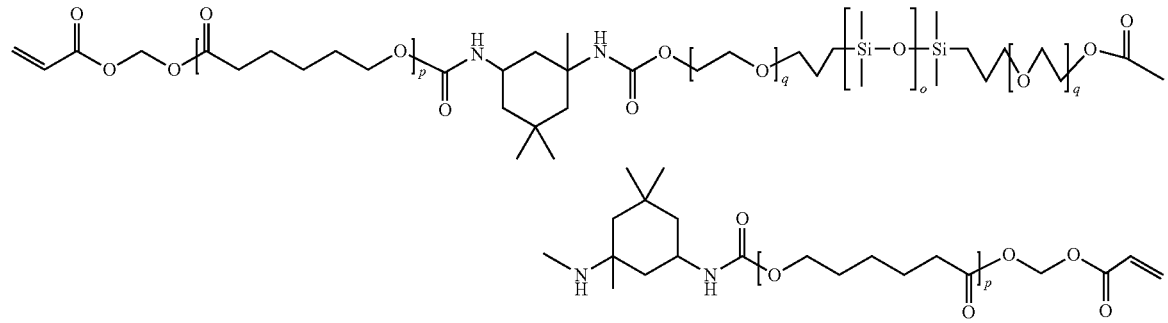

TABLE 1

| | Liquid electrolyte for lithium secondary battery | | | |
|---|---|---|---|---|
| | | Amount of organic solvent added (g) | Oligomer | |
| | Lithium salt | | Formula | Addition amount (g) |
| Example 1 | 1M LiPF$_6$ | 99.5 | 1a-1 | 0.5 |
| Example 2 | 1M LiPF$_6$ | 80 | 1a-1 | 20 |
| Example 3 | 1M LiPF$_6$ | 90 | 1a-1 | 10 |
| Example 4 | 1M LiPF$_6$ | 90 | 1b-1 | 10 |
| Example 5 | 1M LiPF$_6$ | 75 | 1a-1 | 25 |
| Example 6 | 1M LiPF$_6$ | 70 | 1a-1 | 30 |
| Example 7 | 1M LiPF$_6$ | 67 | 1a-1 | 33 |
| Comparative Example 1 | 1M LiPF$_6$ | 100 | — | — |
| Comparative Example 2 | 1M LiPF$_6$ | 99.5 | 2 | 0.5 |

II. Lithium Secondary Battery Including Gel Polymer Electrolyte

Example 8

(Preparation of Composition for Gel Polymer Electrolyte for Lithium Secondary Battery)

A composition for a gel polymer electrolyte for a lithium secondary battery was prepared by adding 0.5 g of the oligomer represented by Formula 1a-1 (weight-average molecular weight (Mw): 3,000, $z1=10$, $x1=3$) and 0.01 g of dimethyl 2,2-azobis(2-methylpropionate) (CAS No. 2589-57-3), as a polymerization initiator, to 99.49 g of an organic solvent (volume ratio of ethylene carbonate (EC):ethyl methyl carbonate (EMC)=3:7) in which 1 M $LiPF_6$ was dissolved (see Table 2 below).

(Electrode Assembly Preparation)

$LiNi_{3/5}Co_{1/5}Mn_{1/5}O_2$ as a positive electrode active material, carbon black as a conductive agent, and polyvinylidene fluoride (PVDF), as a binder, were added in a weight ratio of 94:3:3 to N-methyl-2-pyrrolidone (NMP), as a solvent, to prepare a positive electrode mixture slurry (solid content: 65 wt %). An about 20 µm thick aluminum (Al) thin film, as a positive electrode collector, was coated with the positive electrode mixture slurry and dried, and the coated Al thin film was then roll-pressed to prepare a positive electrode.

A lithium metal electrode was used as a negative electrode.

An electrode assembly was prepared by sequentially stacking the positive electrode, the negative electrode, and a separator formed of three layers of polypropylene/polyethylene/polypropylene (PP/PE/PP).

(Secondary Battery Preparation)

The prepared electrode assembly was put in a battery case, and the composition for a gel polymer electrolyte for a lithium secondary battery was injected, thermally polymerized at 60° C. for 24 hours, and then stored for 2 days at room temperature to prepare a coin cell-type lithium secondary battery including the gel polymer electrolyte for a lithium secondary battery.

Example 9

A composition for a gel polymer electrolyte for a lithium secondary battery and a coin cell-type lithium secondary battery including the gel polymer electrolyte for a lithium secondary battery prepared therefrom were prepared in the same manner as in Example 8 except that the composition for a gel polymer electrolyte for a lithium secondary battery was prepared by adding 20 g of the oligomer represented by Formula 1a-1 (weight-average molecular weight (Mw): 3,000, $z1=10$, $x1=3$) and 0.1 g of dimethyl 2,2-azobis(2-methylpropionate) (CAS No. 2589-57-3), as a polymerization initiator, to 79.9 g of the organic solvent, during the preparation of the composition for a gel polymer electrolyte (see Table 2 below).

Example 10

A composition for a gel polymer electrolyte for a lithium secondary battery and a coin cell-type lithium secondary battery including the gel polymer electrolyte for a lithium secondary battery prepared therefrom were prepared in the same manner as in Example 8 except that the composition for a gel polymer electrolyte for a lithium secondary battery was prepared by adding 10 g of the oligomer represented by Formula 1a-1 (weight-average molecular weight (Mw): 3,000, $z1=10$, $x1=3$) and 0.1 g of dimethyl 2,2-azobis(2-methylpropionate) (CAS No. 2589-57-3), as a polymerization initiator, to 89.9 g of the organic solvent, during the preparation of the composition for a gel polymer electrolyte (see Table 2 below).

Example 11

A composition for a gel polymer electrolyte for a lithium secondary battery and a coin cell-type lithium secondary battery including the gel polymer electrolyte for a lithium secondary battery prepared therefrom were prepared in the same manner as in Example 10 except that the oligomer represented by Formula 1b-1 (weight-average molecular weight (Mw): 5,000, $z2=8$, $x2=6$) was used instead of the oligomer represented by Formula 1a-1, during the preparation of the composition for a gel polymer electrolyte (see Table 2 below)

Example 12

A composition for a gel polymer electrolyte for a lithium secondary battery and a coin cell-type lithium secondary battery including the gel polymer electrolyte for a lithium secondary battery prepared therefrom were prepared in the same manner as in Example 8 except that the composition for a gel polymer electrolyte for a lithium secondary battery was prepared by adding 25 g of the oligomer represented by Formula 1a-1 and 0.1 g of dimethyl 2,2-azobis(2-methylpropionate) (CAS No. 2589-57-3), as a polymerization initiator, to 74.9 g of the organic solvent, during the preparation of the composition for a gel polymer electrolyte (see Table 2 below).

Example 13

A composition for a gel polymer electrolyte for a lithium secondary battery and a coin cell-type lithium secondary battery including the gel polymer electrolyte for a lithium secondary battery prepared therefrom were prepared in the same manner as in Example 8 except that the composition for a gel polymer electrolyte for a lithium secondary battery was prepared by adding 30 g of the oligomer represented by Formula 1a-1 and 0.15 g of dimethyl 2,2-azobis(2-methylpropionate) (CAS No. 2589-57-3), as a polymerization initiator, to 69.85 g of the organic solvent, during the preparation of the composition for a gel polymer electrolyte (see Table 2 below).

Example 14

A composition for a gel polymer electrolyte for a lithium secondary battery and a coin cell-type lithium secondary battery including the gel polymer electrolyte for a lithium secondary battery prepared therefrom were prepared in the same manner as in Example 8 except that the composition for a gel polymer electrolyte for a lithium secondary battery was prepared by adding 33 g of the oligomer represented by Formula 1a-1 and 0.15 g of dimethyl 2,2-azobis(2-methylpropionate) (CAS No. 2589-57-3), as a polymerization initiator, to 66.85 g of the organic solvent, during the preparation of the composition for a gel polymer electrolyte (see Table 2 below).

Comparative Example 3

A composition for a gel polymer electrolyte and a coin cell-type lithium secondary battery including the same were prepared in the same manner as in Example 9 except that the oligomer represented by Formula 2, instead of the oligomer of Formula 1a-1, was included during the preparation of the composition for a gel polymer electrolyte (see Table 2 below).

TABLE 2

| | Composition for gel polymer electrolyte | | | |
|---|---|---|---|---|
| | | Oligomer | | |
| | Amount of organic | | | Amount of polymerization |
| | Lithium salt | solvent added (g) | Formula | Addition amount (g) | initiator added (g) |
| Example 8 | 1M LiPF$_6$ | 99.49 | 1a-1 | 0.5 | 0.01 |
| Example 9 | 1M LiPF$_6$ | 79.9 | 1a-1 | 20 | 0.1 |
| Example 10 | 1M LiPF$_6$ | 89.9 | 1a-1 | 10 | 0.1 |
| Example 11 | 1M LiPF$_6$ | 89.9 | 1b-1 | 10 | 0.1 |
| Example 12 | 1M LiPF$_6$ | 74.9 | 1a-1 | 25 | 0.1 |
| Example 13 | 1M LiPF$_6$ | 69.85 | 1a-1 | 30 | 0.15 |
| Example 14 | 1M LiPF$_6$ | 66.85 | 1a-1 | 33 | 0.15 |
| Comparative Example 3 | 1M LiPF$_6$ | 99.49 | 2 | 0.5 | 0.01 |

EXPERIMENTAL EXAMPLES

Experimental Example 1: Evaluation of Reactivity of Liquid Electrolyte to Lithium Metal (1)

After a three-electrode cell (Li/Li (150 μm) symmetry beaker cell) system was prepared by using a Li foil, the liquid electrolytes for a secondary battery prepared in Examples 1 to 7 and the liquid electrolytes for a secondary battery prepared in Comparative Examples 1 and 2 were respectively injected thereinto.

Subsequently, charge transfer resistance (Rct) measured after 2 hours while applying an alternating voltage of 10 mV using electrochemical impedance spectroscopy (EIS) is listed in Table 3 below. In this case, initial charge transfer resistance in Table 3 denotes charge transfer resistance after a Li/Li electrode was immersed in the electrolyte solution.

TABLE 3

| Examples | Charge transfer resistance (ohm) |
|---|---|
| Initial resistance | 20 |
| Example 1 | 250 |
| Example 2 | 82 |
| Example 3 | 97 |
| Example 4 | 105 |
| Example 5 | 75 |
| Example 6 | 52 |
| Example 7 | 50 |
| Comparative Example 1 | 7,510 |
| Comparative Example 2 | 330 |

In general, in a case in which a chemical reaction between the electrolyte for a lithium secondary battery and Li metal occurs, charge transfer resistance (Rct) is increased while by-products formed due to the decomposition of the electrolyte solution are stacked on a surface of the Li metal.

In this case, referring to Table 3, with respect to the liquid electrolytes for a lithium secondary battery of Examples 1 to 6, since the reaction between the Li metal/the electrolyte was controlled, it may be understood that the charge transfer resistance (Rct) was low at 250 ohm or less even after 2 hours.

Particularly, with respect to the liquid electrolyte for a lithium secondary battery of Example 3 containing the oligomer represented by Formula 1a-1 in which a content ratio of siloxane group (—Si—O—) having relatively low reactivity with Li ions due to the small number of acrylate end groups was relatively high, since an effect of suppressing the chemical reaction between the Li metal and the electrolyte was better than that of the liquid electrolyte for a lithium secondary battery of Example 4 containing the same amount of the oligomer represented by Formula 1b-1, it may be understood that a resistance increase rate was low.

Also, with respect to the liquid electrolyte for a lithium secondary battery of Example 7 containing an excessive amount of the oligomer, since the reactivity with the lithium metal was suppressed, it may be understood that the charge transfer resistance (Rct) was lower than that of the liquid electrolyte for a lithium secondary battery of Example 1 containing a small amount of the oligomer.

In contrast, with respect to the liquid electrolyte for a lithium secondary battery of Comparative Example 1 not containing the oligomer, it may be understood that the charge transfer resistance (Rct) was significantly increased to 7,510 ohm while the by-products due to the reaction between the Li metal/the electrolyte on the surface of the Li metal were increased.

Furthermore, with respect to the liquid electrolyte for a lithium secondary battery of Comparative Example 2 which contained the oligomer of Formula 2 further including a hydrophobic Si unit in the oligomer structure instead of the oligomer of Formula 1, since the reactivity between the Li metal/the electrolyte was relatively increased while wettability of the electrolyte solution was reduced, the chemical reaction between the Li metal/the electrolyte occurred even under environmental conditions, in which Li precipitation was induced, such as overcharge, to allow the by-products formed due to the decomposition of the electrolyte solution to be stacked on the surface of the Li metal, and thus, it may be understood that the charge transfer resistance was about 330 ohm which was inferior to those of the electrolytes for a lithium secondary battery of Examples 1 to 7.

Experimental Example 2: Evaluation of Reactivity of Gel Polymer Electrolyte to Lithium Metal (2)

Reactivities of the compositions for a gel polymer electrolyte prepared in Examples 8 to 14 and the composition for a gel polymer electrolyte prepared in Comparative Example 3 to Li metal were evaluated in the same manner as in Experimental Example 1, and the results thereof are presented in Table 4 below.

TABLE 4

| Examples | Charge transfer resistance (ohm) |
|---|---|
| Example 8 | 120 |
| Example 9 | 29 |
| Example 10 | 47 |
| Example 11 | 51 |
| Example 12 | 23 |
| Example 13 | 32 |
| Example 14 | 30 |
| Comparative Example 3 | 305 |

Referring to Table 4, with respect to the compositions for a gel polymer electrolyte of Examples 8 to 14, since the reaction between the Li metal/the electrolyte was controlled, it may be understood that interfacial resistances were low at 120 ohm or less.

Particularly, with respect to the composition for a gel polymer electrolyte of Example 10 containing the oligomer represented by Formula 1a-1 in which the content ratio of siloxane group (—Si—O—) having relatively low reactivity with Li ions due to the small number of acrylate end groups was relatively high, since the chemical reactivity between the Li metal and the electrolyte was reduced in comparison to the composition for a gel polymer electrolyte of Example 11 containing the same amount of the oligomer represented by Formula 1b-1, a surface diffusion reaction was suppressed, and thus, it may be understood that the resistance increase rate was relatively low.

In contrast, with respect to the composition for a gel polymer electrolyte of Comparative Example 3 which contained the oligomer of Formula 2 further including a hydrophobic Si unit in the oligomer structure instead of the oligomer of Formula 1, since the reactivity between the Li metal/the electrolyte was relatively increased while the wettability of the electrolyte solution was reduced, a large amount of the by-products formed due to the decomposition of the electrolyte solution was stacked on the surface of the Li metal, and thus, it may be understood that the interfacial resistance (Rct) was high at about 305 ohm.

Experimental Example 3: Evaluation of Resistance Characteristics of Liquid Electrolyte (1)

The lithium secondary batteries including the liquid electrolytes for a lithium secondary battery prepared in Examples 1 to 7 and the lithium secondary batteries including the liquid electrolytes for a lithium secondary battery prepared in Comparative Examples 1 and 2 were respectively fully charged at a constant current-constant voltage of 0.33 C/4.2 V at room temperature (25° C.), and discharged at 2.5 C for 10 seconds at a state of charge (SOC) of 50% to perform initial charge and discharge.

Next, initial voltage was measured using PNE-0506 charge/discharge equipment (manufacturer: PNE SOLUTION Co., Ltd., 5 V, 6 A).

Subsequently, a voltage drop obtained in a state in which each of the secondary batteries including the liquid electrolytes for a lithium secondary battery was subjected to a discharge pulse at 3 C for 10 seconds at a SOC of 50% and 25° C. was measured, initial resistance of each cell was calculated using the obtained voltage drop, and the results thereof are listed in Table 5 below. In this case, the voltage drop was measured using the PNE-0506 charge/discharge equipment (manufacturer: PNE SOLUTION Co., Ltd., 5 V, 6 A).

TABLE 5

| | Resistance (mohm), 2.5 C, 10 sec |
|---|---|
| Example 1 | 79 |
| Example 2 | 48 |
| Example 3 | 53 |
| Example 4 | 57 |
| Example 5 | 42 |
| Example 6 | 76 |
| Example 7 | 97 |
| Comparative Example 1 | 135 |
| Comparative Example 2 | 93 |

Referring to Table 5, with respect to the lithium secondary batteries including the liquid electrolytes for a lithium secondary battery of Examples 1 to 6 of the present invention, since the formation of by-products may be suppressed due to the reduction in reactivity between the Li metal and the electrolyte as in the previous results of Experimental Example 1, it may be understood that most of the initial resistances were low at 79 mohm or less.

With respect to the lithium secondary battery of Example 7 which included the liquid electrolyte for a lithium secondary battery containing an excessive amount of the oligomer, since a side reaction with respect to the excessive amount of the oligomer was increased, it may be understood that the initial resistance was increased to 97 mohm.

In contrast, with respect to the lithium secondary battery of Comparative Example 1, which included the liquid electrolyte for a lithium secondary battery not containing the oligomer, and the lithium secondary battery of Comparative Example 2 which included the liquid electrolyte for a lithium secondary battery containing the oligomer represented by Formula 2, since the by-products on the surface of the electrode were increased due to the increase in the reaction between the Li metal and the electrolyte, it may be understood that the initial resistances were respectively 135 mohm and 93 mohm, which were increased in comparison to those of the lithium secondary batteries of Examples 1 to 6.

Experimental Example 4: Evaluation of Resistance Characteristics of Composition for Gel Polymer Electrolyte (2)

After voltage drops of the lithium secondary batteries including the gel polymer electrolytes prepared in Examples 8 to 13 and the lithium secondary battery including the gel polymer electrolyte prepared in Comparative Example 3 were measured in the same manner as in Experimental Example 3, initial resistance of each cell was measured using the obtained voltage drop, and the results thereof are presented in Table 6 below.

TABLE 6

| Examples | Resistance (mohm), 2.5 C, 10 sec |
|---|---|
| Example 8 | 76 |
| Example 9 | 59 |
| Example 10 | 69 |
| Example 11 | 62 |
| Example 12 | 55 |
| Example 13 | 75 |
| Comparative Example 3 | 100 |

Referring to Table 6, with respect to the lithium secondary batteries including the gel polymer electrolytes of Examples 8 to 13, since the reactivity between the Li metal and the electrolyte may be reduced to suppress the formation of the by-products, it may be understood that most of the initial resistances were low at 76 mohm or less.

In contrast, with respect to the lithium secondary battery including the gel polymer electrolyte of Comparative Example 3, since the by-products on the surface of the electrode were increased due to the increase in the reaction between the Li metal and the electrolyte, it may be understood that the initial resistance was 100 mohm, which was increased in comparison to those of the lithium secondary batteries of Examples 8 to 13.

Experimental Example 5: Evaluation of Discharge Capacity of Liquid Electrolyte (1)

The lithium secondary batteries including the liquid electrolytes for a lithium secondary battery prepared in Examples 1 to 6 and the lithium secondary batteries including the liquid electrolytes for a lithium secondary battery prepared in Comparative Examples 1 and 2 were respectively fully charged at a constant current-constant voltage of 0.33 C/4.2 V at 25° C. within a driving voltage range of 3.0 V to 4.2 V, and discharged at 2.5 C for 10 seconds at a SOC of 50% to perform charge and discharge. Subsequently, after the charge and discharge cycle was repeated three times at 0.33 C/0.33 C and 25° C. within a driving voltage range of 3.0 V to 4.2 V, discharge capacity after the third cycle was measured using PNE-0506 charge/discharge equipment (manufacturer: PNE SOLUTION Co., Ltd., 5 V, 6 A). The results thereof are presented in Table 7 below.

TABLE 7

|  | 0.33 C discharge capacity (mAh) |
| --- | --- |
| Example 1 | 63.2 |
| Example 2 | 71.2 |
| Example 3 | 69.2 |
| Example 4 | 67.4 |
| Example 5 | 73.5 |
| Example 6 | 64.1 |
| Comparative Example 1 | 59.7 |
| Comparative Example 2 | 60.5 |

Referring to Table 7, with respect to the lithium secondary batteries including the liquid electrolytes for a lithium secondary battery of Examples 1 to 6, it may be understood that most of the discharge capacities after the third cycle were 63.2 mAh or more.

Particularly, with respect to the lithium secondary battery of Example 3 which included the liquid electrolyte containing the oligomer represented by Formula 1a-1 in which the content ratio of siloxane group (—Si—O—) having relatively low reactivity with Li ions due to the small number of acrylate end groups was relatively high, it may be understood that discharge capacity was more improved than that of the lithium secondary battery of Example 4 which included the liquid electrolyte containing the oligomer represented by Formula 1b-1.

In contrast, with respect to the lithium secondary battery of Comparative Example 1, which included the liquid electrolyte for a lithium secondary battery not containing the oligomer, and the lithium secondary battery of Comparative Example 2 which included the liquid electrolyte for a lithium secondary battery containing the oligomer represented by Formula 2, it may be understood that the discharge capacities after the third cycle were respectively 59.7 mAh and 60.5 mAh, which were inferior to those of the lithium secondary batteries of Examples 1 to 6.

Experimental Example 6: Evaluation of Discharge Capacity of Gel Polymer Electrolyte (2)

Discharge capacities after the third cycle of the lithium secondary batteries including the gel polymer electrolytes prepared in Examples 8 to 13 and the lithium secondary battery including the gel polymer electrolyte prepared in Comparative Example 3 were measured in the same manner as in Experimental Example 5, and the results thereof are presented in Table 8 below.

TABLE 8

| Examples | 0.33 C discharge capacity (mAh) |
| --- | --- |
| Example 8 | 61.2 |
| Example 9 | 64.7 |
| Example 10 | 63.5 |
| Example 11 | 62.5 |
| Example 12 | 65.9 |
| Example 13 | 57.9 |
| Comparative Example 3 | 52.4 |

As illustrated in Table 8, with respect to the lithium secondary batteries including the gel polymer electrolytes prepared in Examples 8 to 13, it may be understood that most of the discharge capacities after the third cycle were high at 57.9 mAh or more.

In contrast, with respect to the lithium secondary battery of Comparative Example 3 including the gel polymer electrolyte containing the oligomer represented by Formula 2, it may be understood that the discharge capacity was 52.4 mAh, which was inferior to those of the lithium secondary batteries of Examples 8 to 13 of the present invention.

Experimental Example 7: Overcharge Stability Evaluation Test

The lithium secondary batteries prepared in Examples 1 to 14 and the lithium secondary batteries prepared in Comparative Examples 1 to 3 were overcharged using PNE-0506 charge/discharge equipment (manufacturer: PNE SOLUTION Co., Ltd., 5 V, 6 A) at a SOC of 100% under conditions including a current rate of 1 C, a bakelite plate (insulation condition), and a voltage of 8.3 V (cut-off), and a temperature at a SOC of 140% was then measured. The results thereof are presented in Table 9 below.

TABLE 9

|  |  | Temperature at 140% SOC |
| --- | --- | --- |
| Liquid electrolyte | Example 1 | 67 |
|  | Example 2 | 56 |
|  | Example 3 | 61 |
|  | Example 4 | 62 |
|  | Example 5 | 53 |
|  | Example 6 | 58 |
|  | Example 7 | 71 |
|  | Comparative Example 1 | 82 |
|  | Comparative Example 2 | 75 |
| Gel polymer electrolyte | Example 8 | 62 |
|  | Example 9 | 48 |
|  | Example 10 | 52 |
|  | Example 11 | 53 |
|  | Example 12 | 42 |
|  | Example 13 | 48 |
|  | Example 14 | 59 |
|  | Comparative Example 3 | 69 |

Referring to Table 9, with respect to the lithium secondary batteries including the liquid electrolytes for a lithium secondary battery prepared in Examples 1 to 6, it may be understood that the temperatures at a SOC of 140% were 67° C. or less.

In contrast, with respect to the lithium secondary battery of Comparative Example 1, which included the liquid electrolyte not containing the oligomer, and the lithium secondary battery of Comparative Example 2 which included the liquid electrolyte containing the oligomer represented by Formula 2, it may be understood that the temperatures at a SOC of 140% were respectively 82° C. and 75° C. which were inferior to those of the lithium secondary batteries including the liquid electrolytes for a lithium secondary battery prepared in Examples 1 to 6.

With respect to the lithium secondary battery which included the liquid electrolyte of Example 7 containing an excessive amount of the oligomer, since the side reaction with respect to the excessive amount of the oligomer was increased, it may be understood that the temperature of the lithium secondary battery at a SOC of 140% was 71° C. which was increased in comparison to those of the secondary batteries including the liquid electrolytes for a lithium secondary battery prepared in Examples 1 to 6.

Also, referring to Table 9, with respect to the lithium secondary batteries including the gel polymer electrolytes prepared in Examples 8 to 14, it may be understood that the temperatures at a SOC of 140% were 62° C. or less.

In contrast, with respect to the lithium secondary battery of Comparative Example 3, it may be understood that the temperature at a SOC of 140% was 69° C. which was inferior to those of the lithium secondary batteries prepared in Examples 8 to 14.

Experimental Example 8: Cycle Life Characteristic Evaluation Test

The lithium secondary batteries prepared in Examples 1 to 14 and the lithium secondary batteries prepared in Comparative Examples 1 to 3 were charged at 1 C/1 C to a voltage of 4.25 V at 45° C., were left standing for 10 minutes, and then discharged at 1 C/1 C to a voltage of 3.0 V. The charging and discharging were set as one cycle, and 500 cycles of charge and discharge were performed.

In this case, capacity after a first cycle and capacity after a $500^{th}$ cycle were measured using PNE-0506 charge/discharge equipment (manufacturer: PNE SOLUTION Co., Ltd., 5 V, 6 A), and a capacity retention was measured by substituting the capacities into the following Equation (1) The results thereof are presented in Table 10 below.

Capacity retention (%)=(capacity after 500 cycles/ capacity after one cycle)×100          Equation (1):

TABLE 10

|  |  | Capacity retention (%) after 500 cycles |
|---|---|---|
| Liquid electrolyte | Example 1 | 91.2 |
|  | Example 2 | 94.2 |
|  | Example 3 | 93.5 |
|  | Example 4 | 93.1 |
|  | Example 5 | 95.5 |
|  | Example 6 | 91.1 |
|  | Example 7 | 87.2 |
|  | Comparative Example 1 | 61 |
|  | Comparative Example 2 | 72 |
| Gel polymer electrolyte | Example 8 | 89.2 |
|  | Example 9 | 92.0 |
|  | Example 10 | 91.5 |
|  | Example 11 | 90.5 |
|  | Example 12 | 92.9 |
|  | Example 13 | 87.4 |
|  | Example 14 | 82.5 |
|  | Comparative Example 3 | 78.5 |

Referring to Table 10, with respect to the lithium secondary batteries including the liquid electrolytes for a lithium secondary battery prepared in Examples 1 to 7, it may be understood that capacity retentions of 87.2% or more may be secured even after 500 cycles.

In contrast, with respect to the lithium secondary battery of Comparative Example 1, which included the liquid electrolyte not containing the oligomer, and the lithium secondary battery of Comparative Example 2 which included the liquid electrolyte containing the oligomer represented by Formula 2, it may be understood that capacity retentions after 500 cycles were respectively 61% and 72%, which were inferior to those of the lithium secondary batteries including the liquid electrolytes for a lithium secondary battery prepared in Examples 1 to 7.

Also, referring to Table 10, it may be understood that the lithium secondary batteries including the gel polymer electrolytes prepared in Examples 8 to 14 may have a capacity retention of 82.5% or more even after 500 cycles.

In contrast, with respect to the lithium secondary battery of Comparative Example 3, it may be understood that capacity retention after 500 cycles was 78.5% which was inferior to those of the lithium secondary batteries prepared in Examples 8 to 14.

The invention claimed is:

1. An electrolyte for a lithium secondary battery, the electrolyte comprising:
   a lithium salt;
   an organic solvent; and
   an oligomer represented by Formula 1 or a polymer derived from the oligomer represented by Formula 1:

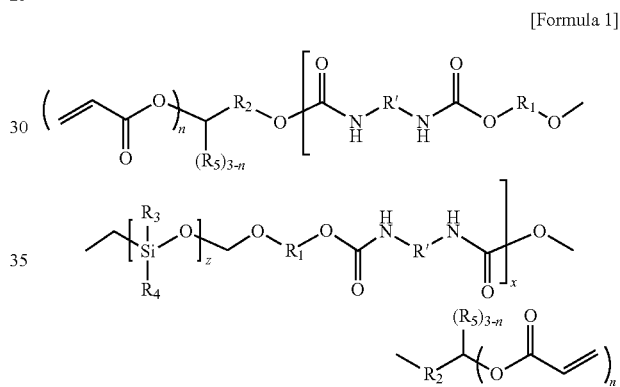

[Formula 1]

wherein, in Formula 1,
   $R_1$ and $R_2$ are each independently a substituted or unsubstituted alkylene group having 1 to 5 carbon atoms,
   $R_3$ and $R_4$ are each independently hydrogen or a substituted or unsubstituted alkyl group having 1 to 3 carbon atoms,
   $R_5$ is hydrogen or a substituted or unsubstituted alkyl group having 1 to 5 carbon atoms,
   R' is an aliphatic hydrocarbon group or an aromatic hydrocarbon group,
   z and x are the numbers of repeating units,
   z is an integer of 1 to 10,
   x is an integer of 1 to 15, and
   n is an integer of 1 to 3.

2. The electrolyte for a lithium secondary battery of claim 1, wherein, in Formula 1,
   the aliphatic hydrocarbon group of R' comprises at least one selected from the group consisting of (a) at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms and (b) at least one linear hydrocarbon group selected from the group consisting of a substituted or unsubstituted alkylene group having 1 to 20 carbon atoms, a substituted or unsubstituted alkoxylene group having 1 to 20 carbon atoms, a substituted or unsubstituted alkenylene group having 2 to 20 carbon atoms, and a substituted or unsubstituted alkynylene group having 2 to 20 carbon atoms, and the aromatic hydrocarbon group of R' comprises at least one selected from the group consisting of a substituted or unsubstituted arylene group having 6 to 20 carbon atoms and a substituted or unsubstituted heteroarylene group having 2 to 20 carbon atoms.

3. The electrolyte for a lithium secondary battery of claim 1, wherein, in Formula 1, the aliphatic hydrocarbon group of R' comprises at least one alicyclic hydrocarbon group selected from the group consisting of a substituted or unsubstituted cycloalkylene group having 4 to 20 carbon atoms, a substituted or unsubstituted cycloalkenylene group having 4 to 20 carbon atoms, and a substituted or unsubstituted heterocycloalkylene group having 2 to 20 carbon atoms.

4. The electrolyte for a lithium secondary battery of claim 1, wherein the oligomer represented by Formula 1 comprises at least one selected from the group consisting of oligomers represented by Formulae 1a and 1b:

[Formula 1a]

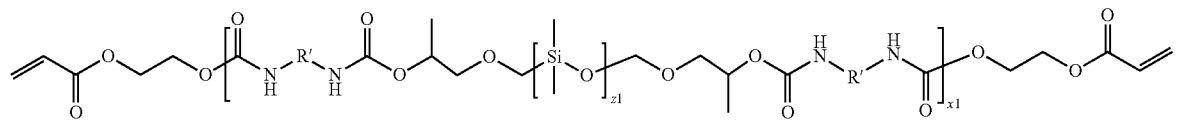

wherein in Formula 1a,
R' is an aliphatic hydrocarbon group or an aromatic hydrocarbon group,
z1 and x1 are the numbers of repeating units,
z1 is an integer of 1 to 10, and
x1 is an integer of 1 to 15,

[Formula 1b]

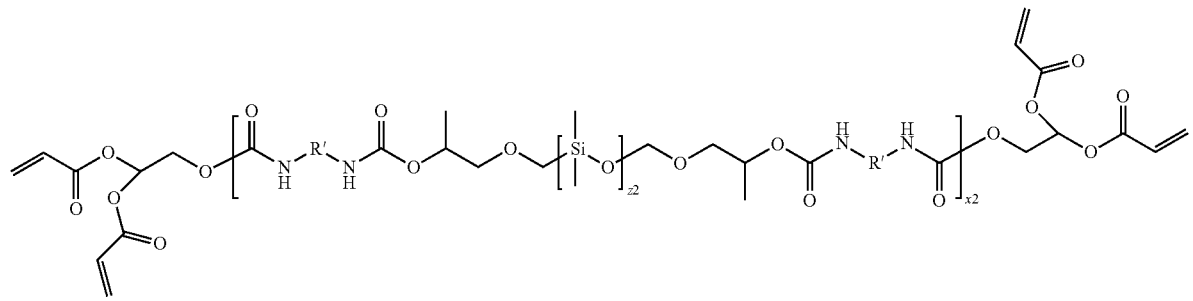

wherein in Formula 1b,
R' is an aliphatic hydrocarbon group or an aromatic hydrocarbon group,
z2 and x2 are the numbers of repeating units,
z2 is an integer of 1 to 10, and
x2 is an integer of 1 to 15.

5. The electrolyte for a lithium secondary battery of claim 1, wherein the oligomer represented by Formula 1 comprises at least one selected from the group consisting of oligomers represented by Formulae 1a-1 and 1b-1:

[Formula 1a-1]

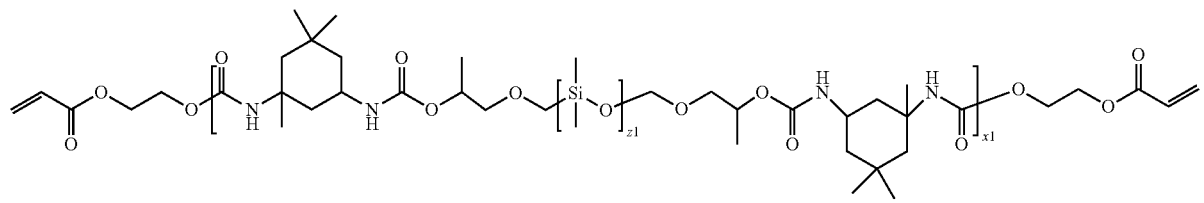

wherein in Formula 1a-1,
z1 and x1 are the numbers of repeating units,
z1 is an integer of 1 to 10, and
x1 is an integer of 1 to 15,

[Formula 1b-1]

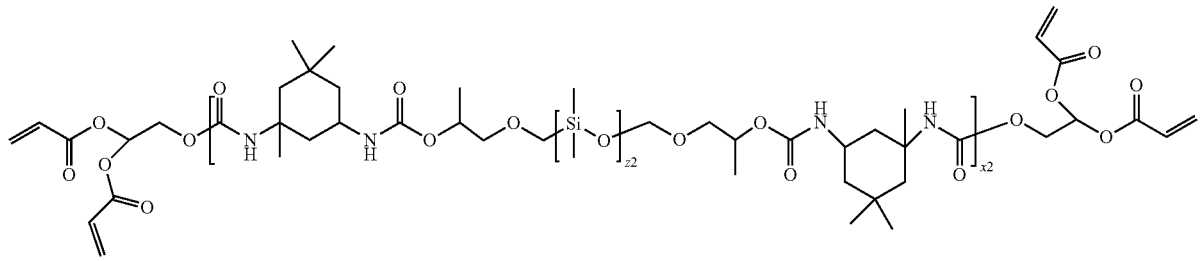

wherein in Formula 1b-1,
z2 and x2 are the numbers of repeating units,
z2 is an integer of 1 to 10, and
x2 is an integer of 1 to 15.

6. The electrolyte for a lithium secondary battery of claim 1, wherein the electrolyte for a lithium secondary battery is a liquid electrolyte containing the oligomer represented by Formula 1.

7. The electrolyte for a lithium secondary battery of claim 6, wherein the oligomer represented by Formula 1 is included in an amount of 0.5 wt % to 30 wt % based on a total weight of the electrolyte for a lithium secondary battery.

8. The electrolyte for a lithium secondary battery of claim 6, wherein the oligomer represented by Formula 1 is included in an amount of 0.5 wt % to 25 wt % based on a total weight of the electrolyte for a lithium secondary battery.

9. The electrolyte for a lithium secondary battery of claim 1, wherein the electrolyte for a lithium secondary battery is a gel polymer electrolyte containing the polymer derived from the oligomer represented by Formula 1.

10. The electrolyte for a lithium secondary battery of claim 9, wherein the polymer derived from the oligomer represented by Formula 1 is a matrix polymer in which the oligomer represented by Formula 1 is polymerized in the presence of a polymerization initiator to have a three-dimensional structure.

11. The electrolyte for a lithium secondary battery of claim 9, wherein the polymer derived from the oligomer represented by Formula 1 is included in an amount of 0.5 wt % to 30 wt % based on a total weight of the electrolyte for a lithium secondary battery.

12. The electrolyte for a lithium secondary battery of claim 9, wherein the polymer derived from the oligomer represented by Formula 1 is included in an amount of 0.5 wt % to 25 wt % based on a total weight of the electrolyte for a lithium secondary battery.

13. A lithium secondary battery comprising a positive electrode, a negative electrode, a separator, and the electrolyte for a lithium secondary battery of claim 1.

14. The lithium secondary battery of claim 13, wherein the electrolyte for a lithium secondary battery is a liquid electrolyte.

15. The lithium secondary battery of claim 13, wherein the electrolyte for a lithium secondary battery is a gel polymer electrolyte.

16. The lithium secondary battery of claim 13, wherein the negative electrode is a metal electrode using a metal or metalloid thin film alone, or is composed of a structure in which the metal or metalloid thin film is stacked on a negative electrode collector.

* * * * *